Oct. 11, 1960 T. F. SCHLICKSUPP 2,955,880
AIR LOADER FOR GRANULAR PLASTIC MATERIAL
Filed Nov. 8, 1957 2 Sheets-Sheet 1

INVENTOR.
Theodore F. Schlicksupp
BY
HIS ATTORNEYS

Oct. 11, 1960 T. F. SCHLICKSUPP 2,955,880
AIR LOADER FOR GRANULAR PLASTIC MATERIAL
Filed Nov. 8, 1957 2 Sheets-Sheet 2
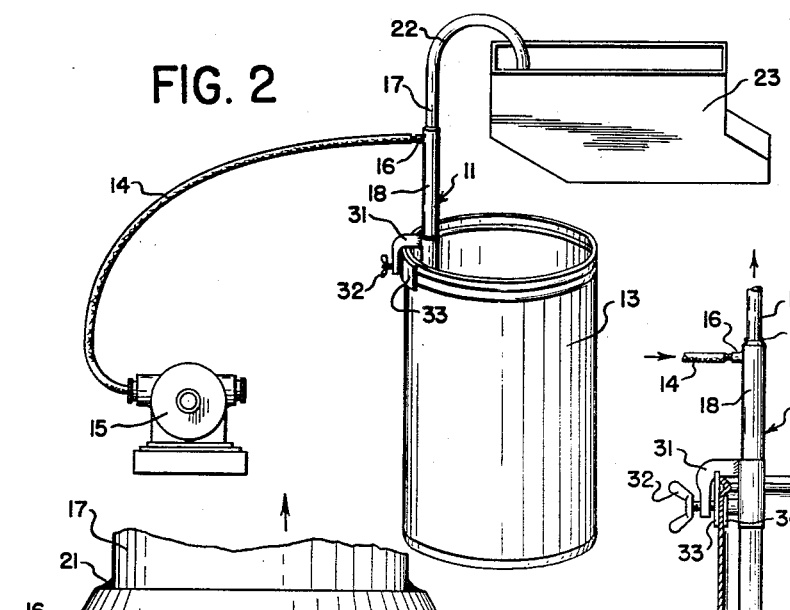
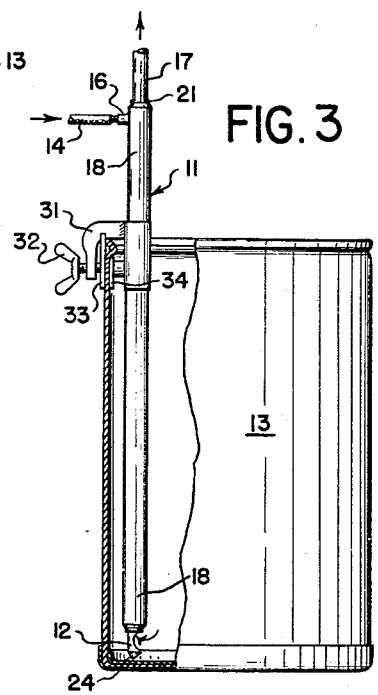
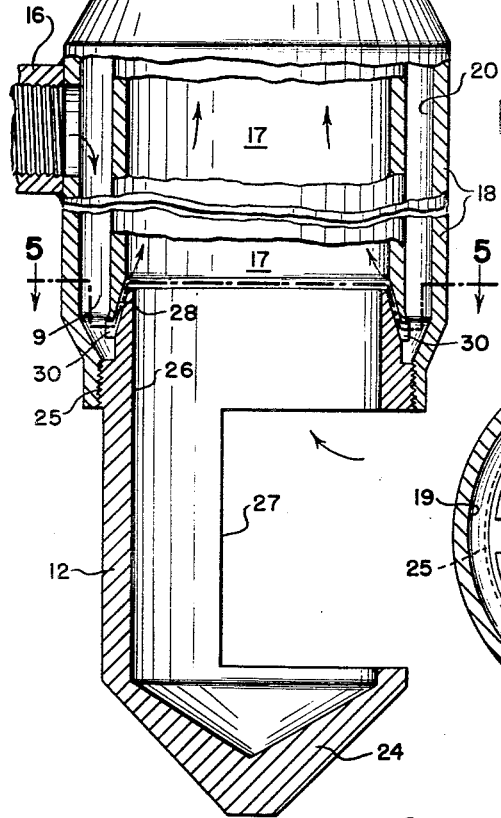
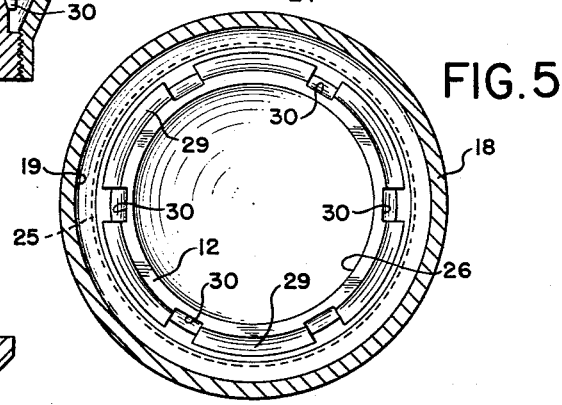
INVENTOR.
Theodore F. Schlicksupp
BY
HIS ATTORNEYS United States Patent Office 2,955,880
Patented Oct. 11, 1960

2,955,880
AIR LOADER FOR GRANULAR PLASTIC MATERIAL

Theodore F. Schlicksupp, Essex Fells, N.J. (% Parker & Company, 1616 Walnut St., Philadelphia 3, Pa.); H. Michael Albers, executor of said Theodore F. Schlicksupp, deceased Filed Nov. 8, 1957, Ser. No. 695,321

2 Claims. (Cl. 302—58)

This invention relates to air-lift devices for handling dry granular material in bulk form and transferring such material, as from a supply container or bin to a point at a higher elevation, usually the hopper of an apparatus for utilizing or treating such material. The present application is in part a continuation of my co-pending application Serial No. 674,230, filed July 25, 1957, entitled "Grinding, Mixing and Feeding Apparatus for Plastic Molding Machines."

In the operation of plastic molding machines fresh plastic, in granular form, which is received from the manufacturer in barrels or drums is fed to the hopper of the molding apparatus, either with or without the addition of a predetermined amount of used plastic which has been reduced to granular form in a suitable apparatus such as the machine of my prior application. Also, in that machine which is intended for grinding up plastic scrap and for mixing therewith a desired amount of fresh plastic, a bin for the fresh plastic is provided and the air-lift device of the present invention may advantageously be used to maintain the fresh plastic at the desired level in such bin.

The object of the present invention is to provide an air-lift device which is not only effective to transfer the granular plastic material as required by such apparatus, but also one which can be easily and quickly inserted in a mass of the material such as that contained in a barrel of fresh, or ground-up used plastic.

Another object of the present invention is to provide an air-lift of this kind which requires a minimum of air pressure for its operation, for example, an air pressure as low as about three pounds per square inch.

An air-lift device of this sort comprises a slender, tubular spear-like structure advantageously having a pointed head secured thereto at its lower end, such a structure being readily inserted into a mass of the granular material with the lower end or head positioned at a substantial depth in such mass. It is necessary to provide an offset on the interior of the conveying tube for the granular material, with a series or row of air jet passages opening into the interior of the conveying tube at this offset portion.

It is a further object of the present invention to provide a construction of the head member and the lower end of the conveying tube by which the offset portion is reduced to a minimum and the area of the interior of the head portion which feeds the material into the lower end of the conveying tube, is as large as possible. This is important not only to provide for a large capacity when handling fresh plastic, but also in the handling of the ground used plastic. When such plastic is heated somewhat it becomes gummy and this causes the granules to adhere to one another in such a way as to tend to bridge-over and clog the head passage. By my improved construction of the head and conveying tube this problem has been overcome.

A still further object of the invention is to provide a construction of the head portion and lower end of the conveying tube which includes air passages of a type which can be readily cleaned should the occasion arise.

A still further object of the invention is to provide an air-lift device of this kind which will automatically maintain the level of the granular material in the bin or hopper into which it is discharged.

The invention will be better understood by considering the accompanying drawings and the following detailed description.

In these drawings:

Fig. 1 is a perspective view showing the air-lift device in association with the plastic grinding machine of my co-pending application, previously referred to;

Fig. 2 shows the air-lift device in more general use for transferring granular plastic material from a barrel;

Fig. 3 is a view of the barrel of Fig. 2 shown partly in vertical section and partly in elevation with the air-lift device applied thereto;

Fig. 4 is a view of the air-lift device in vertical, central section and drawn to a greatly enlarged scale; and Fig. 5 is a view in transverse section taken on line 5—5 of Fig. 4.

Figure 1:
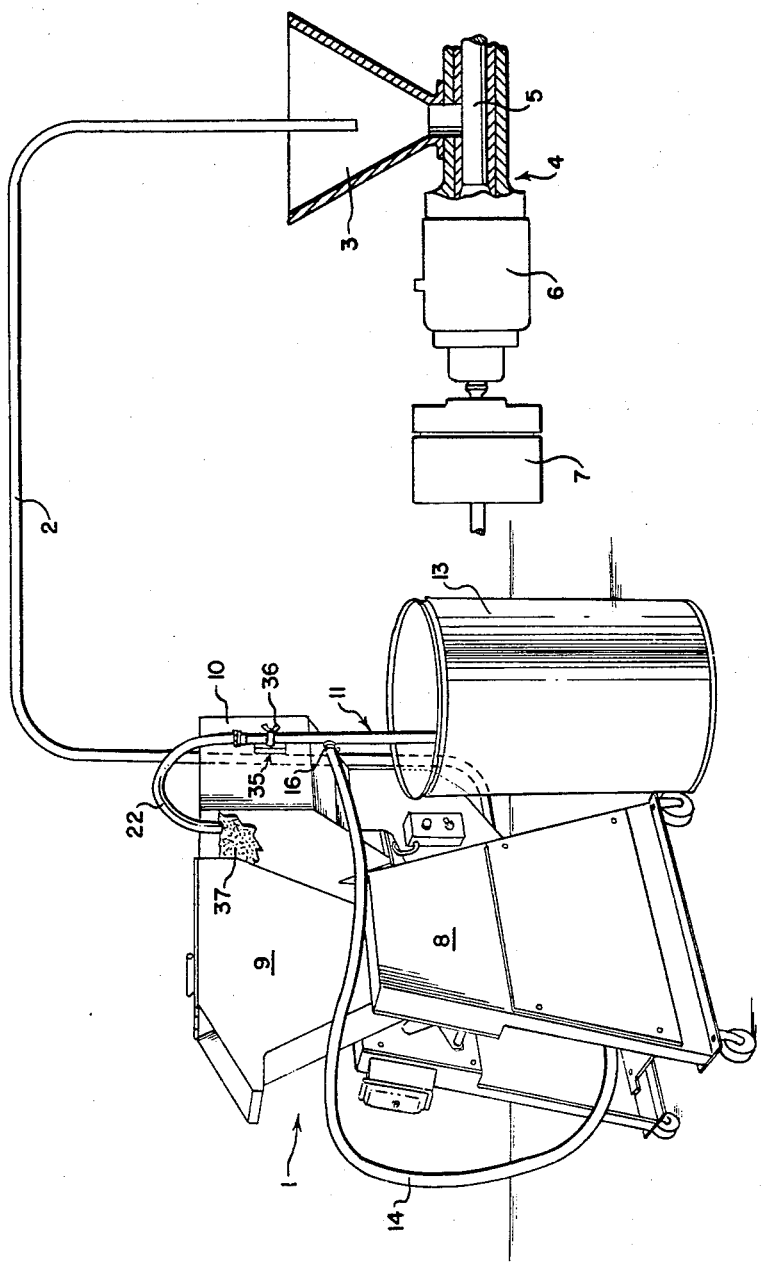

Referring now to these drawings, there is shown in Fig. 1 a grinder-mixer-conveyer apparatus 1 for grinding up sprue scrap or other used plastic material and reducing it to granular form, thereafter mixing it with a predetermined amount of fresh plastic material and delivering it through the pipe 2 to the hopper 3 of a thermoplastic molding machine indicated generally by the numeral 4. This molding apparatus comprises a plunger 5 which is operated by suitable power means (not shown) a heating section 6, and a molding section 7, the latter being in two separable parts to facilitate the removal of the molded articles.

The grinder-mixer-conveyer apparatus 1 is described in detail in my co-pending application referred to. Briefly, it comprises a suitable frame structure 8 within which is mounted a rotary grinder on cutter mechanism driven by an electric motor, none of such parts being visible in the drawing. The scrap plastic material, from the mold 7, or other source, is fed by hand into the mouth of a hopper 9 which delivers it to the rotary cutter mechanism. After passing this mechanism it is mixed with fresh plastic, a supply of which is maintained in a bin 10 mounted on the rear of the apparatus 1. The mixing is done by means of a pneumatic mixing-conveying device (not shown) which thoroughly mixes the two materials and conveys them through pipe 2 to hopper 3.

The air-lift device 11 which is the subject of the present invention is a slender, spear-like tubular structure terminating at its lower end in a head 12 (Figs. 3 and 4). This spear-like structure is of sufficient length to extend to the bottom of a barrel 13, for example, in which fresh plastic in granular form is shipped by the manufacturer to the user.

Air under suitable pressure for operating the air-lift device may be supplied through the flexible hose 14 and this hose may be connected with the same pump (not shown) which supplies air to the pneumatic mixing and conveying device of apparatus 1, or from a separate air pump 15, as shown in Fig. 2. The hose 14 is joined to the spear-like air-lift device 11 by means of a connection 16 which is located at a sufficient distance from the head 12 so as to be above the top of the tallest barrel 13 with which the air-lift device is to be used.

Referring to Fig. 4 the air-lift device comprises an inner tube or pipe 17 for conveying the granular material, and an outer tubular member 18 which forms an air-supply chamber 19 surrounding the lower end of pipe 17, and which advantageously may be extended to a point above the air inlet connection 16 so as to form an annular air passage 20 for delivering the air entering through connection 16 to the air supply chamber 19. The upper end of the outer pipe 18 may be welded as indicated at 21 to the outer surface of the conveying tube or pipe 17 so as to close the upper end of annular space 20.

The conveyer tube 17 terminates at its upper end in a curved delivery pipe 22 which may be a separate member and connected to the delivery pipe as shown in Fig. 1, or may merely be a continuation of this delivery pipe, as shown in Fig. 2. Pipe 22 discharges the granular material substantially vertically downward either into bin 10 of Fig. 1 or the hopper or other receptacle 23 of Fig. 2.

The head member 12 is a hollow casting desirably having a pointed lower end 24 and being externally threaded at 25 for the purpose of securing the head member to the lower end of the outer tubular member 18 which may advantageously be reduced somewhat in diameter and have a conical form so as to avoid an abrupt shoulder. Both the pointed end of head 12 and the conical formation, just referred to, facilitate the working of the spear-like device into the granular plastic material.

Head 12 has an interior cylindrical passage 26 which is in axial alignment with the inner conveyer tube 17 and through which the flow of the material from the mass within the barrel 13 is directed to the lower end of tube 17, such material entering passage 26 through a wide lateral opening 27 in the side of the head member.

The connection of passage 26 with the lower end of inner tube member 17 is by means of a conical joint, and for this purpose the end of member 17 is provided with an internal conical surface 28, the member being advantageously flared to a slight extent. Fitting the internal coned surface 28 there is an external coned surface 29 (Fig. 5) which is formed on the outer end of head 12 around the periphery of the cylindrical passage 26. It will be understood that when the threads 25 of the head member are screwed into the lower end of the outer tubular member 18 these two coned surfaces 28 and 29 will be forced into close engagement with one another.

The air jet passages 30 for the air-lift device are formed as shallow open slots equally spaced around the circumference of the external coned surface 29. These slots converge on the axis of conveying tube 17 and are placed at an angle thereto of from 15° to 25° depending upon the size of the air-lift device, that is, the diameter of conveying tube 17.

Should the air jet passages become clogged after extended use the head 12 may be unscrewed from the end of the outer pipe 18 and the open slots 30 may then be very readily cleaned with a brush or otherwise.

It will be understood that flow of the air through converging air jet passages causes a reduction in pressure within the head member 12 which draws in the granular plastic material through the opening 27 into the cylindrical passage 26. Upon meeting the streams of air the material is carried upwardly through the conveying tube 17 and to the discharge member 22.

By making the slots 30 thin and wide (the depth being about twenty thousandths of an inch), the shoulder formed at the entrance of the air passages into the conveying tube 17 is extremely small with the result that the diameter of cylindrical passage 26 is only slightly less than that of the conveying tube. Moreover, the length of passage 26 from the top of lateral opening 27 is short and I have found that there is no tendency for the plastic material to bridge over even though the material is gummy because of being warm.

Air-lift device 11 may be supported in upright position in any convenient manner. As shown in Figs. 2 and 3, a clamping bracket 31 is mounted on the exterior of the air-lift device and provided with a manually operated clamping screw 32 which forces an arcuate jaw 33 against the outside surface of barrel 13 and into engagement with an interior member 34.

If desired, instead of employing the clamping device 31, a clamp 35 may be mounted on the side of the receiving bin such as bin 10 of Fig. 1, the clamp being applied to the air-lift device by means of a thumb screw 36. The air-lift device being constructed as a slender, spear-like member it can be removed from one barrel and easily worked into the mass of plastic material in a full barrel which has been brought into position.

One of the advantages of my improved air-lift device is the fact that it operates with great effectiveness on extremely low air pressure. For example, an air pressure as low as three pounds per square inch is adequate to operate an air-lift device of the three-quarter inch size, that is, having a conveying tube 17 of three-quarter inch pipe. With larger sizes the air pressure may be increased to five or six pounds per square inch. A remarkably large delivery of the granular plastic material into the receiving receptacle is obtained even with the lowest air pressure.

A further advantage of my improved air-lift device is the automatic regulation of the level of the plastic material in the receiving hopper. As shown in Fig. 1 the level of the mass 37 of plastic material which has been delivered to bin 10 is slightly above the discharge end of the delivery pipe 22. When the level of the plastic has risen to this point just slightly above the discharge end, the flow of air will be retarded and this will stop the delivery of the material by the air-lift device, although air continues to flow out of the end of the pipe and to escape through the mass of plastic.

As the level of the plastic is lowered through the continuing operation of the grinding-mixing conveying apparatus 1, when the level descends below the bottom of the delivery pipe outlet, the flow of the plastic will be re-established. Such automatic control of the level of the plastic in bin 10 is obtained without the use of the usual control mechanism having moving parts and often of a more or less complicated nature.

While the invention has been described in connection with one particular embodiment thereof, it will be understood that various changes may be made and, consequently, the scope of the invention is set forth in the appended claims.

I claim:
1. An air-lift device for bulk granular material comprising a tubular member having a conical formation on one end thereof, an air supply chamber surrounding one end of said tubular member, said chamber having a wall with a threaded portion at one end, a flow-directing member for the granular material having an axial passage in line with said tubular member, said flow-directing member having a conical formation thereon extending into contacting engagement with said conical formation on said tubular member, one of said interengaging conical formations having axially extending grooves therein uniformly spaced around its periphery and forming air jet passages converging towards the center of said tubular member, said conical formations, except for said grooves, being in contact with one another throughout their peripheries, and said flow-directing member having a threaded connection with said threaded portion for holding said conical formations in engagement with one another.

2. An air-lift device for bulk granular material comprising inner and outer concentric tubes spaced apart from one another to provide an air supply passage on the exterior of said inner tube, the ends of said tubes at one end of said device being staggered with respect to one another with the end of the outer tube projecting beyond that of the inner tube, said inner tube having an internal conical formation thereon, and a flow-directing member for the granular material having a threaded connection with said projecting end of said outer tube, said flow-directing member having an external conical formation thereon extending into engagement with said internal formation on said inner tube and being secured in engagement therewith by said threaded connection with said outer tube so as to hold the parts in operative position with respect to one another, said interengaging conical formations including air jet passages converging towards the axis of said inner member, said inner member forming a conduit for the flow of said granular material.

References Cited in the file of this patent

UNITED STATES PATENTS

| | | |
|---|---|---|
| 337,388 | Fernald | Mar. 9, 1886 |
| 1,416,013 | Gieseler | May 16, 1922 |
| 1,833,341 | Thompson | Nov. 24, 1931 |
| 2,614,002 | Snow | Oct. 14, 1952 |
| 2,653,438 | Ramirez | Sept. 29, 1953 |
| 2,684,867 | Berg | July 27, 1954 |
| 2,774,636 | Whitlock | Dec. 18, 1956 |
| 2,831,732 | Rieser | Apr. 22, 1958 |